United States Patent [19]

Takakura et al.

[11] Patent Number: 5,962,612

[45] Date of Patent: Oct. 5, 1999

[54] FLUORINE-CONTAINING COPOLYMER HAVING RINGS ON ITS MAIN CHAIN

[75] Inventors: Teruo Takakura; Toru Ishida, both of Yokohama, Japan

[73] Assignee: Asahi Glass Company Ltd., Tokyo, Japan

[21] Appl. No.: 08/979,659

[22] Filed: Nov. 26, 1997

[30] Foreign Application Priority Data

Nov. 28, 1996 [JP] Japan ................................. 8-318190
Dec. 17, 1996 [JP] Japan ................................. 8-337264

[51] Int. Cl.⁶ ........................................... C08F 12/20
[52] U.S. Cl. ........................ 526/249; 526/254; 526/255
[58] Field of Search ................................ 526/249, 254, 526/255

[56] References Cited

U.S. PATENT DOCUMENTS

| | | | |
|---|---|---|---|
| 3,953,409 | 4/1976 | Komatsu et al. | 526/249 |
| 4,501,869 | 2/1985 | Tatemoto et al. | 526/249 |
| 4,701,508 | 10/1987 | Homma et al. . | |
| 5,066,747 | 11/1991 | Yoshimura et al. | 526/249 |
| 5,177,166 | 1/1993 | Kobo et al. . | |
| 5,229,473 | 7/1993 | Kobo et al. . | |
| 5,283,304 | 2/1994 | Nakabayashi et al. . | |

FOREIGN PATENT DOCUMENTS

| | | |
|---|---|---|
| 0 312 834 | 4/1989 | European Pat. Off. . |
| 0 372 805 | 6/1990 | European Pat. Off. . |
| 0 437 619 | 7/1991 | European Pat. Off. . |
| 0 464 704 | 1/1992 | European Pat. Off. . |

OTHER PUBLICATIONS

Patent Abstract of Japan, vol. 18, No. 415 (C–1233), Aug. 4, 1994, JP 6 122730, May 6, 1994.
Answer 7 of 29 JP 06122730–940506 by Marcumoto Etsuzo et al; in house computer generated abstract pp. 16, 17.

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

A fluorine-containing copolymer comprising (a) polymer units based on a fluoroolefin, (b) polymer units based on a cyclic monomer having, on its ring, an unsaturated group copolymerizable with the fluoroolefin, (c) polymer units based on an ethylenically unsaturated compound having a curable moiety but having neither an ester bond nor an ether bond, and optionally (d) polymer units based on at least one olefin selected from ethylene, propylene and isobutylene, or polymer units based on a vinyl ether having an aliphatic ring, in such proportions that, based on the total amount of polymer units (a), (b), (c) and (d), polymer units (a) are from 35 to 65 mol %, polymer units (b) are from 5 to 45 mol %, polymer units (c) are from 1 to 30 mol % and polymer units (d) are from 0 to 40 mol %, which has a number average molecular weight within a range of from 2,000 to 100,000, as calculated as polystyrene by gel permeation chromatograph, and which has rings based on said cyclic monomer, on the main chain of the copolymer.

16 Claims, No Drawings

FLUORINE-CONTAINING COPOLYMER HAVING RINGS ON ITS MAIN CHAIN

The present invention relates to a fluorine-containing copolymer having rings on its main chain, which gives a coating film excellent in chemical resistance, antifouling properties, rain streak fouling resistance, weather resistance, etc. and which presents excellent storage stability or efficiency for drying when formed into a powder coating material, and a resin composition for coating, which comprises such a copolymer.

A thermoplastic dispersion type fluorine resin coating material comprising polyvinylidene fluoride as the main component, or a solvent-soluble type thermosetting fluorine resin coating material comprising a copolymer of a fluoroolefin with a vinyl ether or a vinyl ester as the main component, has been widely used in recent years in the field of coating materials for heavy corrosion prevention or for building or industrial purposes, by virtue of the corrosion resistance, durability and antifouling properties of the coating film (JP-B-60-21667, JP-A-59-102962, JP-A-61-57609).

Further, a powder fluorine resin coating material of low pollution type has been proposed whereby the discharge amount of an organic solvent is reduced to cope with the problem of environmental pollution which becomes serious year after year (JP-A-1-103670, JP-A-2-60968, JP-A-6-345822, JP-A-7-145332).

A fluorine resin coating material comprising polyvinylidene fluoride as the main component, is thermoplastic and is accordingly required to be baked at a high temperature, and since it is a crystalline resin, the gloss of the coating film tends to be inadequate, whereby the application is rather limited. Further, a low melting point fluorine resin coating material has also been proposed which is obtained by copolymerizing vinylidene fluoride with tetrafluoroethylene or hexafluoropropylene (JP-A-3-220272), but since the coating material has no curable moiety and forms no crosslinked coating film, it is inferior in the solvent resistance or mechanical strength.

On the other hand, a thermosetting fluorine resin coating material has curable moieties and can be used as powder coating at a relatively low temperature to obtain a coating film excellent in gloss, transparency, solvent resistance and mechanical strength. However, with conventional powder fluorine resin coating materials, it has been common to copolymerize a vinyl ether monomer or a vinyl ester monomer to raise the glass transition temperature (hereinafter referred to as Tg) of the fluorine resin, or to copolymerize a vinyl ether monomer, an allyl ether monomer or a crotonic acid alkyl monomer, having a hydroxyl group, an epoxy group or a carboxyl group, as a monomer having a curable moiety, in order to improve the storage stability. Consequently, a monomer having a high boiling point is used. The fluorine resin is not so thermally stable and can not be dried at a high temperature, whereby there has been problems such that the solid content ratio of the powder can not be increased since a non-reacted high boiling point monomer, etc. will remain during drying, and coloring or gelation of the powder tends to result.

Further, a fluorine-containing copolymer for coating has also been proposed wherein for the purpose of increasing Tg, 2,5-norbornadiene, vinyl carboxylate and a vinyl monomer having a hydroxyl group are copolymerized (JP-A-6-122730). However, the vinyl monomer having a hydroxyl group, is described to be a monomer having "a hydroxyl group and an ester bond" or "a hydroxyl group and an ether bond" in its molecule, such as hydroxyethyl crotonate, hydroxybutyl vinyl ether, hydroxyethyl allyl ether or hydroxyethyl methacrylate, i.e. a monomer having a curable moiety and an ester bond or an ether bond. A fluorine-containing copolymer having such a monomer copolymerized, is susceptible to oxidation, and with a powder coating material containing such a fluorine-containing copolymer, drying is not easy, since gelation, increase of the molecular weight and coloring are likely to be brought about at the time of heating.

Further, in order to solve a problem of fouling of the surface of a coated product, a coating composition having a polymer having a polyfluorinated carbon chain and a hydrophilic group incorporated, has been proposed in recent years (JP-A-1-198653). The coating composition of this proposal is effective for preventing formation of spot-like fouling by rain water. However, it is not adequate for prevention of streak fouling (hereinafter referred to as rain streak fouling) formed at a portion where rain water collects and flows, of an outdoor article, such as under a window pane of a building.

Further, a coating composition having a condensate of an organosilicate incorporated, has been proposed (WO94/06870). However, the composition of this proposal has had a problem such that rain streak fouling is likely to form at the initial stage of outdoor exposure, although an effect for reducing rain streak fouling is observed by an observation for a long period of time. Further, the coating film by this composition has a poor interlaminar adhesion when a coating material of the same type is re-coated thereon, and peeling may sometimes take place.

The present invention has been made to solve the above-described problems and provides a fluorine-containing copolymer comprising (a) polymer units based on a fluoroolefin, (b) polymer units based on a cyclic monomer having, on its ring, an unsaturated group copolymerizable with the fluoroolefin, (c) polymer units based on an ethylenically unsaturated compound having a curable moiety but having neither an ester bond nor an ether bond, and optionally (d) polymer units based on at least one olefin selected from ethylene, propylene and isobutylene, or polymer units based on a vinyl ether having an aliphatic ring, in such proportions that, based on the total amount of polymer units (a), (b), (c) and (d), polymer units (a) are from 35 to 65 mol %, polymer units (b) are from 5 to 45 mol %, polymer units (c) are from 1 to 30 mol % and polymer units (d) are from 0 to 40 mol %, which has a number average molecular weight within a range of from 2,000 to 100,000, as calculated as polystyrene by gel permeation chromatograph, and which has rings based on said cyclic monomer, on the main chain of the copolymer.

Further, the present invention provides a resin composition for coating, which comprises such a fluorine-containing copolymer and a curing agent, and a resin composition for powder coating comprising such a fluorine-containing copolymer and a curing agent.

Now, the present invention will be described in detail with reference to the preferred embodiments.

The fluoroolefin which gives polymer units (a), is a polymerizable olefin having at least one fluorine atom. Specifically, tetrafluoroethylene, chlorotrifluoroethylene, trifluoroethylene, vinylidene fluoride, pentafluoropropylene or hexafluoropropylene is preferred. Particularly preferred is a $C_{2-3}$ perhaloolefin such as tetrafluoroethylene, chlorotrifluoroethylene or hexafluoropropylene.

When the stability during polymerization, storage stability and low coloring are important, a fluoroolefin containing no chlorine atom is preferred. Particularly preferred is tetrafluoroethylene from the viewpoint of the stability during polymerization.

Polymer units (b) are polymer units based on a cyclic monomer having, on its ring, an unsaturated group copolymerizable with the fluoroolefin, and the copolymer of the present invention has rings derived from this cyclic monomer on its main chain. The copolymer having rings on its main chain means that at least two carbon atoms constituting each ring are carbon atoms in the carbon chain constituting the main chain of the copolymer.

The monomer which gives polymer units (b), is not particularly limited so long as it is a monomer having a cyclic unsaturated group copolymerizable with the fluoroolefin. A compound is preferred in which such a ring is an aliphatic ring or a heterocyclic ring. Further, this monomer is preferably one having no ester bond.

The compound wherein the above ring is an aliphatic ring, may, for example, be a compound having at least two aliphatic rings, such as a norbornadiene, a norbornene or a dicyclopentadiene, or a compound having one aliphatic ring, such as cyclohexene, cyclopentene or cyclopentadiene.

The norbornadiene may, for example, be a 2,5-norbornadiene having an aryl group, such as 2-acetoxy-3-phenyl-2,5-norbornadiene, or 2,5-norbornadiene.

The norbornene may, for example, be a 2-norbornene having an alkyl group, such as 5-ethylbicyclo[2.2.1]hepto-2-ene, a 2-norbornene having an alkalidene group, such as 5-ethylidene bicyclo[2.2.1]hepto-2-ene, a 2-norbornene having a alkenyl group, such as 5-vinylbicyclo[2.2.1]hepto-2-ene or 5-allylbicyclo[2.2.1]hepto-2-ene, a 2-norbornene having an aryl group, such as 3-phenyl-2-norbornene, or 2-norbornene.

When the monomer which gives polymer units (b), has an alkenyl group, the alkenyl group has low polymerizability as compared with the unsaturated group in the ring, and the alkenyl group will remain after polymerization. Such an alkenyl group may be oxidized to convert it to an epoxy group, or may be utilized as it is, as a vulcanizable moiety.

As a compound wherein the above ring is a heterocyclic ring, dihydrofuran, furan, γ-pyran, pyrrole or thiophene may, for example, be mentioned.

From the viewpoint of giving polymerizability and high Tg, 5-ethylidene bicyclo[2.2.1]hepto-2-ene, 5-vinylbicyclo[2.2.1]hept-2-ene, 2,5-norbornadiene or 2-norbornene is preferred. Particularly preferred is 2,5-norbornadiene or 2-norbornene.

Polymer units (c) are polymer units based on an ethylenically unsaturated compound having a curable moiety but having neither an ester bond nor an ether bond. The monomer for polymer units (c) is a monomer having no ring or a monomer having a ring provided that the ring has no unsaturated group copolymerizable with the fluoroolefin, and thus is different from the monomer for polymer units (b).

The curable moiety may, for example, be a hydroxyl group, an epoxy group, a carboxyl group, a carboxylic anhydride group, a hydrolyzable silyl group, an amino group, a carbonyl group, a thiol group or an aldehyde group. When the fluorine-containing copolymer of the present invention is applied to a powder coating material the curable moiety is particularly preferably a hydroxyl groups, an epoxy group or a carboxyl group.

It is essential that polymer units (c) contain neither an ester bond nor an ether bond, and it is preferred that they have no fluorine atom. From the viewpoint of the polymerization yield, storage stability, availability, reactivity with a curing agent and boiling point, the monomer having a hydroxyl group is preferably an α-olefin having a hydroxyl group, the monomer having an epoxy group is preferably an epoxy compound having a vinyl group, and the monomer having a carboxyl group is preferably an unsaturated carboxylic acid.

The α-olefin having a hydroxyl group is preferably allyl alcohol. The epoxy group having a vinyl group may, for example, be an alicyclic epoxy compound having a vinyl group, such as 3-vinylcyclohexene oxide, or a linear or branched epoxy compound, such as 1,3-butadiene monoepoxide.

The unsaturated carboxylic acid may, for example, be 3-butenoic acid, 4-pentenoic acid, 3-hexenoic acid, 4-hexenoic acid, 5-hexenoic acid, 5-heptenoic acid, 6-heptenoic acid, 6-octenoic acid, 7-octenoic acid, 7-nonenoic acid, 8-nonenoic acid, 8-decenoic acid, 9-decenoic acid, 9-undecenoic acid, 10-undecenoic acid, 11-tridecenoic acid or 12-tridecenoic acid. Further, a monomer having a carboxyl group blocked by a vinyl ether may be copolymerized and then dissociated under an acidic condition.

The monomer which gives polymer units (d) is an optional component, and the copolymer may not contain polymer units (d) at all. However, by using a monomer which gives polymer units (d), the flexibility of the fluorine-containing copolymer of the present invention will be improved, and surprisingly, there is an effect that the larger the amount of polymer units (d), the less the coloring during heating at a high temperature.

The monomer which gives polymer units (d), is at least one olefin selected from ethylene, propylene and isobutylene, or a vinyl ether having an aliphatic ring, such as cyclohexyl vinyl ether. Vinyl carboxylate and a linear alkylvinyl ether are not suitable to the present invention, since they bring about substantial coloring. Surprisingly, however, a vinyl ether having an aliphatic ring, such as cyclohexyl vinyl ether, has a feature that coloring is specifically little. The olefin and such a vinyl ether may be used in combination. As the monomer which gives polymer units (d), a vinyl ether having an aliphatic ring is preferred, since it has a substantial effect for reducing coloring. As distinguished from polymer units (a), the vinyl ether having an aliphatic ring, does not contain an unsaturated group copolymerizable with the fluoroolefin in its aliphatic ring.

The respective proportions based on the total amount of polymer units (a), (b), (c) and (d) of the present invention, are such that polymer units (a) are from 35 to 65 mol %, polymer units (b) are from 5 to 45 mol %, polymer units (c) are from 1 to 30 mol %, and polymer units (d) are from 0 to 40 mol %. The preferred respective proportions are such that polymer units (a) are from 40 to 60 mol %, polymer units (b) are from 10 to 40 mol %, polymer units (c) are from 5 to 30 mol %, and polymer units (d) are from 0 to 20 mol %. Here, the proportion of polymer units (d) being 0 mol %, means that polymer units (d) may not be contained at all.

When the fluorine-containing copolymer of the present invention is used for a coating material, if the proportion of polymer units (a) is too small, the weather resistance tends to be poor, and if it is too large, the compatibility with a curing agent for the coating material or the adhesion to the object to be coated, tends to be poor. If the proportion of polymer units (b) is too small, Tg of the fluorine-containing copolymer can not be made high, and if it is too large, the weather resistance of the coating film tends to be impaired. If the proportion of polymer units (c) is too small, crosslinking of the resulting coating film tends to be inadequate, and if it is too large, Tg of the fluorine-containing copolymer can not be made high. If the proportion of polymer units (d) is too large, Tg of the fluorine-containing copolymer can not be made high.

The fluorine-containing copolymer of the present invention preferably has a Tg within a range of from 30 to 100° C. When it is used for powder coating, it preferably has a Tg within a range of from 40 to 80° C. If Tg is too low, blocking of the powder particles is likely to result, and if Tg is too high, no adequate fluidity can be obtained during coating under heating, whereby the appearance of the coating film tends to be impaired, such being undesirable.

The "number average molecular weight as calculated as polystyrene by gel permeation chromatograph" (hereinafter referred to simply as Mn) of the fluorine-containing copolymer of the present invention, is usually from 2,000 to 100,000, preferably from 2,500 to 100,000, more preferably from 3,000 to 30,000.

When the fluorine-containing copolymer of the present invention is used for a coating material, Mn is preferably from 2,000 to 50,000, more preferably from 3,000 to 20,000, most preferably from 3,000 to 10,000. If Mn is too small, no adequate weather resistance tends to be obtained, and if it is too large, the viscosity of the varnish tends to be high, and the efficiency for coating operation tends to be poor, and particularly when it is used for powder coating, the melt viscosity tends to be too high, whereby a smooth coating film can hardly be obtainable, such being undesirable.

When the fluorine-containing copolymer of the present invention is used for a coating material, a curing agent, a curing assisting catalyst, a surface regulating agent, a surface smoothing agent, a silane coupling agent, an ultraviolet absorber, a photostabilizer, a coloring pigment, a metallic pigment, an extender pigment, etc., may be incorporated to the resin composition for coating of the present invention, as the case requires. Further, together with the fluorine-containing copolymer, a known resin commonly used for a composition for coating, such as an acrylic resin, a polyester resin, an alkyd resin, an amino resin, an epoxy resin or a polyurethane resin, may be used.

The curing agent may, for example, be methylol-modified melamine, methylol-modified benzoguanamine, an amino resin, a blocked isocyanate, an organic amine, an organic metal compound, a metal chelate compound, an acid, a base, a blocked acid, or a blocked base.

When a curing agent is incorporated to the resin composition for coating of the present invention, its proportion is preferably from 1 to 70 parts by weight, more preferably from 5 to 50 parts by weight, per 100 parts by weight of the fluorine-containing copolymer.

When the curable moieties of the fluorine-containing copolymer are epoxy groups, the curing agent may, for example, be a dibasic acid, a dibasic acid having carboxyl groups blocked, a polycarboxylic anhydride, dicyan diamide or a blocked isocyanate compound. When any one of these curing agents is used, the fluorine-containing copolymer may have not only epoxy groups but also hydroxyl groups, as the curable moieties. Especially when the curing agent is an acid anhydride, the coexistent of hydroxyl groups is preferred, since hydroxyl groups serve to improve the curing reactivity.

The dibasic acid may be an aliphatic dibasic acid such as fumaric acid, succinic acid, adipic acid, azelaic acid, sebacic acid or dodecanedioic acid, or an aromatic dibasic acid such as isophthalic acid or trimellitic acid. An aliphatic dibasic acid is preferred. Particularly preferred is dodecanedioic acid.

The dibasic acid having carboxyl groups blocked, may be a hydrazide compound such as adipic acid dihydrazide, sebacic acid dihydrazide, dodecanedioic acid dihydrazide, eicosanedioic acid dihydrazide, isophthalic acid dihydrazide, azelaic acid dihydrazide, suberic acid dihydrazide or pyromellitic acid tetrahydrazide.

Further, a compound having the above dibasic acid blocked with a vinyl ether may also be used. Here, the vinyl ether may, for example, be an alkylvinyl ether such as methyl vinyl ether, ethyl vinyl ether, n-propyl vinyl ether, isopropyl vinyl ether, n-butyl vinyl ether, sec-butyl vinyl ether or tert-butyl vinyl ether.

When the above curing agent is used, a curing assisting catalyst may be used in combination to accelerate the curing reaction. Such a curing assisting catalyst may, for example, be an imidazole or its derivative, or an amine compound such as diaminodiphenylmethane or 1,8-diazabicyclo[5.4.0]undeca-7-ene. Further, in order to improve the storage stability at room temperature, an organic acid such as formic acid or acetic acid may be used in combination.

The polycarboxylic anhydride may, for example, be succinic anhydride, phthalic anhydride, hexahydrophthalic anhydride, 4-methylhexahydrophthalic anhydride, trimellitic anhydride or pyromellitic anhydride or polyacid anhydride (ADDITOL VXL1381: tradename, manufactured by Vianova Co.). Further, when the fluorine-containing copolymer has epoxy groups, curing may be carried out by means of a cationic polymerization catalyst. When heated, this catalyst is activated to produce cation species or a Lewis acid, whereby ring opening polymerization of epoxy groups will be carried out. As such a catalyst, an aromatic sulfonyl salt may, for example, be mentioned. Further, a copper complex of imidazole as disclosed in Polymer Bulletin 33, 347–353, 1994, may similarly be used.

When the curable moieties of the fluorine-containing copolymer are hydroxyl groups only, it is preferred to use a blocked isocyanate compound, an urethodione compound or a tetramethoxyglycoluryl (POWDERLINK 1174: tradename, manufactured by American Cyanamid Co., Ltd.) as a curing agent.

The blocked isocyanate compound may, for example, be a polyisocyanate compound such as hexamethylene diisocyanate, isophorone diisocyanate, tolylene diisocyanate or xylylene diisocyanate having isocyanate groups blocked with a blocking agent such as ε-caprolactam, phenol or methyl ethyl oxime ketone, or a polyisocyanate compound, such as a dimer or trimer of such a polyisocyanate compound. Further, a curing assisting catalyst such as dibutyltin dilaurate may be used in combination.

When the fluorine-containing copolymer has carboxyl groups as the curable moieties, a compound having an epoxy group, or a compound having an acid amide group, may be used as the curing agent. Specifically, triglycidyl isocyanurate or polyepoxide may, for example, be mentioned.

In a case where the fluorine-containing copolymer of the present invention is used as a resin composition for coating, if a polymer having hydrophilic groups, is incorporated, it is possible to impart a hydrophilic nature to the coating film, whereby rain streak fouling resistance can be improved. Here, the polymer having hydrophilic groups is preferably a partial hydrolyzate of polyvinyl acetate, a partial hydrolyzate of an ethylene-vinyl acetate copolymer, or an acrylate or methacrylate polymer having an addition polymer of ethylene oxide in its side chain.

The polymer having hydrophilic groups, preferably has a Mn of from 500 to 5,000, more preferably from 500 to 2000, whereby it scarcely falls off from the coating film surface, and the fluidity during coating will be good.

The above-mentioned partial hydrolyzate is preferably a partial hydrolyzate having a hydrolysis ratio of from 70 to 90%, whereby an adequate hydrophilic nature can be obtained, and the hygroscopic nature is not so high that when it is used for powder coating, the powder is scarcely susceptible to blocking.

In the acrylate or methacrylate polymer having an addition polymer of ethylene oxide on its side chain, the polymerization degree of ethylene oxide is preferably from 5 to 20. This polymer may be one having an acrylate or methacrylate having a fluoroalkyl group copolymerized.

When the polymer having hydrophilic groups is incorporated to the resin composition for coating of the present invention, the blend proportion is preferably from 1 to 20 parts by weight, more preferably from 1 to 10 parts by weight, per 100 parts by weight of the fluorine-containing copolymer. By such a blend proportion, a proper hydrophilic nature is obtainable and rain streak fouling is less likely to result, and when it is used for powder coating, the hygroscopic nature of the powder will not be so high that blocking of the powder is less likely.

When the curable moieties of the fluorine-containing copolymer are epoxy groups, the epoxy equivalent is preferably within a range of from 250 to 3,000 mgKOH/g, more preferably from 600 to 1,500 mgKOH/g. If the epoxy equivalent is too small, the coating film tends to be hard and brittle, and if it is too large, the mechanical strength of the coating film tends to be poor.

When the curable moieties of the fluorine-containing copolymer are hydroxyl groups, the hydroxyl value is preferably within a range of from 10 to 150 mgKOH/g. When the curable moieties of the fluorine-containing copolymer are carboxyl groups, the acid value is preferably within a range of from 10 to 200 mgKOH/g. If the hydroxyl value or the acid value is too small, the mechanical strength of the coating film tends to be poor, and if the hydroxyl value or the acid value is too large, the coating film tends to be hard and brittle.

When the fluorine-containing copolymer has epoxy groups and hydroxyl groups, the hydroxyl value is preferably from 10 to 100 mgKOH/g, and the epoxy equivalent is preferably within a range of from 600 to 3,000 mgKOH/g.

When the fluorine-containing copolymer of the present invention is used for powder coating, the above-mentioned fluorine-containing copolymer having curable moieties, the polymer having hydrophilic groups, the curing agent, the catalyst and various additives, are pulverized. For the pulverization, in order for the material to be solid at room temperature and free from a blocking phenomenon, the residual amount (the heating residue) of a volatile component (such as a solvent) in the fluorine-containing copolymer when the fluorine-containing copolymer is heated at 170° C. for 1 hour, is usually preferably at most 3%, more preferably at most 2%, most preferably at most 1%.

If the heating residue exceeds 3%, the storage stability tends to be poor, and defects such as pinholes and blistering of the coating film are likely to form during coating under heating. For this purpose, the boiling points of the monomers which give polymer units (b), (c) and (d) are preferably low. A preferred boiling point is at most 180° C. under atmospheric pressure.

As a method for pulverizing the composition for powder coating of the present invention, there may be mentioned a method wherein a mixture comprising the fluorine-containing copolymer, the polymer having hydrophilic groups, the curing agent, the catalyst and various additives, is mixed in a dry system, then melted and kneaded at a temperature of from 100 to 120° C., followed by pulverization and classification to obtain a powder, or a method wherein a solution of the above mixture is dissolved in a supercritical phase using carbon dioxide and a polar organic solvent, followed by rapid expansion to obtain a powder.

Further, for the purpose of improving the fluidity or preventing blocking of the powder particles, the surface of the particles may be coated with organic and/or inorganic fine particles. Such inorganic fine particles may, for example, be barium sulfate, calcium carbonate, aluminum oxide, calcium silicate, magnesium silicate, antimony oxide, titanium dioxide, iron oxide or fine silica powder. The organic fine particles may, for example, be a polyolefin or an acrylic copolymer.

Now, the present invention will be described in further detail with reference to Examples (Examples 1 to 7, 13 and 19 to 25), Comparative Examples (Examples 8 to 12, 14 to 17 and 2 to 30) and Preparation Example (Example 18) for synthesizing a hydrophilic copolymer. In the following, some compounds are represented by their abbreviations as identified in Tables 1 and 2.

TABLE 1

| | |
|---|---|
| CTFE | Chlorotrifluoroethylene |
| HFP | Hexafluoropropylene |
| TFE | Tetrafluoroethylene |
| TriFE | Trifluoroethylene |
| NB | 2-Norbornene |
| NBD | 2,5-Norbornadiene |
| AA | Allyl alcohol |
| UA | Undecenoic acid |
| VCHO | 3-Vinylcyclohexene oxide |
| CHVE | Cyclohexyl vinyl ether |
| ET | Ethylene |
| IBT | Isobutylene |

TABLE 2

| | |
|---|---|
| AGE | Ally glycidyl ether |
| HBVE | 4-Hydroxybutyl vinyl ether |
| HEAE | 2-Hydroxyethyl allyl ether |
| HEC | 2-Hydroxyethyl crotonate |
| VP | Vinyl pivalate |
| VB | Vinyl benzoate |
| Veova-9 | Tradename for an vinyl ester of a branched carboxylic acid (carbon number: 9) manufactured by Shell Co. |
| HCFC225 | Dichloropentafluoropropane |
| PBPV | t-Butyl peroxypivalate |
| TGI | Triglycidyl isocyanurate |
| DBTDL | Dibutyltin dilaurate |

EXAMPLE 1

Into a stainless steel autoclave having an internal capacity of 2.5 l and equipped with a stirrer (pressure resistance: 50 kg/cm$^2$ G), 40.3 g of NBD, 27.5 g of CHVE and 12.7 g of AA were charged, and dissolved air was removed by repeating deaeration under cooling and pressurizing by nitrogen gas.

Then, 1,777 g of HCFE225 and 131.3 g of TFE were introduced into the autoclave, and the temperature was raised.

When the temperature in the autoclave reached 60° C., the pressure became 10.0 kg/cm$^2$ G. Then, 2 cc of a 50% HCFC225 solution of PBPV was added, and the reaction was initiated. While maintaining the pressure as the pressure decreased, 218.8 g of TFE, 70.0 g of CHVE, 100.8 g of NBD and 31.7 g of AA were continuously added to carry out the reaction continuously.

During the reaction, 23 cc of a 50% HCFC225 solution of PBPV was continuously added. Ten hours later, feeding the respective monomers was stopped, and the reaction was continued to 2 kg/cm² G. Then, the autoclave was cooled with water to terminate the reaction.

When the temperature reached room temperature, unreacted monomers were purged, and the autoclave was opened. The obtained polymer was dried under reduced pressure of 4 mmHg over 5 hours to remove the solvent and then pulverized by an impact hammer mill to obtain a powder of a fluorine-containing copolymer. The results of the analysis of the composition by $^{13}$C-NMR are shown in the upper portion in Table 3 (at the righthand side of "/"). Further, the composition of charged monomers is shown in the upper portion in Table 3 (at the lefthand side of "/").

EXAMPLES 2 TO 17

In the same manner as in Example 1, copolymerization was carried out with the compositions of charged monomers as identified in the upper portions in Tables 3 to 5 (the lefthand side of "/") to obtain powders of fluorine-containing copolymers. The results of the analyses of the compositions by $^{13}$C-NMR are likewise shown in the upper portions in Tables 3 to 5 (the lefthand side of "/").

Symbols a to d in the column of the monomers in Tables 3 to 5 indicate the types of the monomers corresponding to polymer units (a) to (d).

Measurement of the Physical Properties

Mn, Tg and the thermal stability (increase in the molecular weight after heating at 120° C. for 5 hours: ⊙ indicates an increase of less than 1.1, ○ less than 1.2, Δ less than 1.4, and x at least 1.4) of the fluorine-containing copolymers obtained in Examples 1 to 17 are shown in the lower portions in Tables 3 to 5.

EXAMPLE 18

Into a three-necked separable flask having an internal capacity of 1 l, 23.2 g of methyl methacrylate, 8.7 g of NK ester M-40G (tradename for polyethylene glycol monomethacryl ester, manufactured by Shin Nakamura Kagaku K.K., polymerization degree of ethylene oxide: 7), 26.2 g of styrene and 300 g of butyl acetate, were charged, and the upper spatial portion was flushed with nitrogen gas. The temperature was raised to 80° C., and then 0.8 g of azobisisobutyronitrile was added to initiate the reaction. Then, as the polymerization proceeded, 70 g of methyl methacrylate, 26.2 g of NK ester M-40G and 78.5 g of styrene were added to let the reaction proceed.

Six hours later, the reaction was terminated, and after cooling, the obtained polymer was dried under a reduced pressure of 4 mmHg for 5 hours to remove the solvent, and then pulverized by an impact hammer mill, to obtain a powder of a hydrophilic copolymer (Mn: about 2,000) composed of an acrylic copolymer having hydrophilic groups.

EXAMPLE 19

37 Parts by weight of the powder of the fluorine-containing copolymer obtained in Example 1, 3.7 parts by weight of MERCENE H-6960 (tradename for a partial hydrolyzate of an ethylene/vinyl acetate copolymer, manufactured by Toso Corporation, Mn: about 1,000, hydrolysis ratio: 80%) as a hydrophilic copolymer, 9.2 parts by weight of ADDUCT B-1530 (tradename for ε-caprolactam blocked isocyanate, manufactured by Huls Co.), 0.12 part by weight of DBTDL, 0.5 part by weight of MODAFLOW 2000 (tradename for a leveling agent made of an acrylic polymer, manufactured by Monsant Co.), 2 part by weight of TINUVIN 900 (tradename for a benzotriazole type ultraviolet ray absorber, manufactured by Ciba Geigy AG), and 0.7 part by weight of TINUVIN 144 (tradename for a hindered amine type photostabilizer, manufactured by Ciba Geigy AG), were mixed for about 1 minute by a Henschel mixer (tradename for a dry blender, manufactured by Mitsui Kakoki K.K.), then extruded at a temperature of from 90 to 130° C., and melt-mixed by means of a kneader, BUSSCOKNEADER PR-46 (manufactured by Buss Japan Ltd.). Then, the mixture was cooled to 10° C. and then pulverized by an impact hammer mill, followed by sieving with a metal screen of 180 mesh to obtain a thermosetting fluorine-containing powder coating material.

Then, the above powder coating material was coated by electrostatic spray coating on an iron plate having zinc phosphate treatment applied, and having a thickness of 1.8 mm, so that the dried film thickness would be 40 μm, and then dried and cured at 170° C. for 30 minutes, whereupon the film performance tests as identified in Table 9 were carried out. The results are shown in Table 10.

EXAMPLES 20 TO 30

Using the powders of the fluorine-containing copolymers obtained in Examples 2 to 9 and 15 to 17, the resin compositions having the weight ratios as identified in Tables 6 to 8, were prepared in the same manner as in Example 19, and electrostatic spray coating was carried out in the same manner, whereupon the coating film performance tests as identified in Table 9 were carried out. The results are shown in Tables 10 and 11.

In Tables 6 to 8, MERCENE H-6822X (tradename) is a partial hydrolyzate (Mn: about 800, hydrolysis ratio: 80%) of an ethylene/vinyl acetate copolymer, manufactured by Toso Corporation; VINYL ALCOHOL #500 (tradename) is a partial hydrolyzate (Mn: about 500, hydrolysis ratio: 78%) of polyvinyl acetate, manufactured by Kanto Kagaku K.K.; VINYL ALCOHOL #2000 (tradename) is a partial hydrolyzate (Mn: about 2000, hydrolysis ratio: 78%) of polyvinyl acetate, manufactured by Kanto Kagaku K.K.; CORONATE 2507 is ε-caprolactam blocked isocyanate, manufactured by Nippon Polyurethane K.K.; and SANAID SI-100L is a cationic polymerization catalyst, manufactured by Sanshin Kagaku K.K.

TABLE 3

| Monomer (mol %) | | Ex. 1 | Ex. 2 | Ex. 3 | Ex. 4 | Ex. 5 | Ex. 6 |
|---|---|---|---|---|---|---|---|
| a | TFE | 60/52 | 60/51 | | 60/50 | | 70/58 |
| a | HFP | | | 70/42 | | | |
| a | TriFE | | | | | 70/43 | |
| b | NBD | 20/26 | | 15/23 | 20/26 | 15/30 | 20/38 |
| b | NB | | 20/23 | | | | |
| c | VCHO | | 10/11 | 5/13 | | | |
| c | AA | 10/8 | | | 10/9 | 5/7 | 10/4 |
| d | CHVE | 10/14 | 10/15 | 10/22 | 10/15 | 10/20 | |
| Mn | | 6,000 | 8,300 | 4,300 | 5,800 | 5,100 | 4,800 |
| Tg (° C.) | | 68 | 52 | 48 | 58 | 43 | 62 |
| Thermal stability | | ⊙ | ⊙ | ⊙ | ⊙ | ⊙ | ⊙ |

TABLE 4

| Monomer (mol %) | | Ex. 7 | Ex. 8 | Ex. 9 | Ex. 10 | Ex. 11 | Ex. 12 |
|---|---|---|---|---|---|---|---|
| a | TFE | 60/49 | | | | | 50/48 |
| a | CTFE | | 60/52 | 50/51 | 50/51 | 50/50 | |
| b | NBD | 20/21 | 20/25 | | | | |
| c | VCHO | 10/16 | | | | | |
| d | CHVE | 10/14 | | | 20/19 | | |
|   | VP | | 10/15 | 10/22 | 20/21 | | 20/22 |
|   | Veova-9 | | | 10/22 | 20/20 | 20/22 | 10/9 |
|   | VB | | | | | 10/8 | 10/9 |
|   | HBVE | | | 10/8 | | | 10/12 |
|   | HEAE | | | | | 10/8 | 10/9 |
|   | HEC | | 10/8 | | | | |
|   | AGE | | | | | 10/11 | |
| Mn |   | 8,100 | 5,300 | 8,100 | 5,40 | 4,600 | 6,700 |
| Tg (° C.) |   | 72 | 62 | 58 | 52 | 49 | 43 |
| Thermal stability |   | ⊚ | X | X | X | X | X |

TABLE 5

| Monomer (mol %) | | Ex. 13 | Ex. 14 | Ex. 15 | Ex. 16 | Ex. 17 |
|---|---|---|---|---|---|---|
| a | TFE | | 60/51 | 60/52 | | |
| a | HFP | 70/42 | | | | |
| a | TriFE | | | | | |
| a | CTFE | | | | 50/51 | 50/50 |
| b | NBD | 15/23 | | 15/22 | | |
| b | NB | | 20/23 | | | |
| c | UA | | | 10/8 | | |
| c | AA | 5/13 | | | | |
| d | ET | 10/22 | | 10/15 | | |
| d | IBT | | 10/15 | | | |
|   | VP | | | | 20/21 | 10/8 |
|   | Veova-9 | | | | 20/20 | 20/22 |
|   | HEAE | | 5/6 | | | |
|   | AGE | | 5/5 | 15/11 | | 10/9 |
|   | HBVE | | | | | 10/11 |
| Mn |   | 4,300 | 7,300 | 5,100 | 5,400 | 4,600 |
| Tg (° C.) |   | 46 | 51 | 43 | 52 | 49 |
| Thermal stability |   | ⊚ | Δ | Δ | X | X |

TABLE 6

| | Ex. 19 | Ex. 20 | Ex. 21 | Ex. 22 | Ex. 23 |
|---|---|---|---|---|---|
| Fluorine-containing copolymer | | | | | |
| Example 1 | 37 | | | | |
| Example 2 | | 36 | | | |
| Example 3 | | | 36 | | |
| Example 4 | | | | 39 | |
| Example 5 | | | | | 37 |
| Hydrophilic copolymer | | | | | |
| MERCENE H-6960 | 3.7 | | | | |
| MERCENE H-6822X | | 3.6 | | | |
| VINYL ALCOHOL #500 | | | 3 | | |
| VINYL ALCOHOL #2000 | | | | 3.9 | |
| Example 18 | | | | | 2.4 |
| Curing agent | | | | | |
| ADDUCT B-1530 | 9.2 | | | 8.7 | |
| CORONATE 2507 | | | | | 9.2 |
| Dodecanedioic acid | | 2.5 | | | |
| Catalyst | | | | | |
| SANAID SI-100L | | | 0.8 | | |

TABLE 6-continued

| | Ex. 19 | Ex. 20 | Ex. 21 | Ex. 22 | Ex. 23 |
|---|---|---|---|---|---|
| DBTDL | 0.12 | | | 0.12 | 0.12 |
| 2-Methylimidazole | | 0.2 | | | |
| Additives | | | | | |
| MODAFLOW 2000 | 0.5 | 0.5 | 0.5 | 0.5 | 0.5 |
| TINUVIN 900 | 2 | 2 | 2 | 2 | 2 |
| TINUVIN 144 | 0.7 | 0.7 | 0.7 | 0.7 | 0.7 |

TABLE 7

| | Ex. 24 | Ex. 25 | Ex. 26 | Ex. 27 |
|---|---|---|---|---|
| Fluorine-containing copolymer | | | | |
| Example 6 | 37 | | | |
| Example 7 | | 38 | | |
| Example 8 | | | 37 | |
| Example 9 | | | | 36 |
| Hydrophilic copolymer | | | | |
| MERCENE H-6960 | 3.7 | | | |
| MERCENE H-6822X | | 3.8 | | |
| VINYL ALCOHOL #500 | | | 3 | |
| VINYL ALCOHOL #2000 | | | | 3.6 |
| Curing agent | | | | |
| ADDUCT B-1530 | | | 5.3 | |
| CORONATE 2507 | 8.8 | | | 4.7 |
| Dodecanedioic acid | | | | |
| Dodecanedioic acid dihydrazide | | 12.8 | | |
| Catalyst | | | | |
| 2-Methylimidazole | | 0.2 | | |
| DBTDL | 0.12 | | 0.12 | 0.12 |
| Additives | | | | |
| MODAFLOW 2000 | 0.5 | 0.5 | 0.5 | 0.5 |
| TINUVIN 900 | 2 | 2 | 2 | 2 |
| TINUVIN 144 | 0.7 | 0.7 | 0.7 | 0.7 |

TABLE 8

| | Ex. 28 | Ex. 29 | Ex. 30 |
|---|---|---|---|
| Fluorine-containing copolymer | | | |
| Example 15 | | 36 | |
| Example 16 | 36 | | |
| Example 17 | | | 36 |
| Hydrophilic copolymer | | | |
| Example 18 | | 2.4 | |
| Curing agent | | | |
| Dodecanedioic acid | 6.2 | | |
| Dodecanedioic acid dihydrazide | | | 2.3 |
| TGI | | 2.6 | |
| Catalyst | | | |
| 2-Methylimidazole | 0.2 | | 0.1 |
| DBTDL | | 0.12 | |
| Additives | | | |
| MODAFLOW 2000 | 0.5 | 0.5 | 0.5 |
| TINUVIN 900 | 2 | 2 | 2 |
| TINUVIN 144 | 0.7 | 0.7 | 0.7 |

Table 9

Storage stability of a coating material:

15 g of a powder coating material was taken into a test tube having an inner diameter of 40 mm and left to stand for 240 hours at 40° C. under a load of 20 g/cm², whereupon a sample was taken out, whereby one which returned to the initial powder state was rated "good", and one wherein blocks were observed, was rated "bad".

Solvent resistance:

A coating film was rubbed with an absorbent cotton impregnated with xylene 100 times in reciprocation under a load of 500 g/cm², whereby presence or absence of scratch marks or peeling was inspected.

Acid resistance:

On a coated film, 10% sulfuric acid was placed to form a spot with a diameter of 1 cm and heated at 60° C. for 1 hour, whereby abnormality was visually inspected. Symbol ○ indicates that no abnormality was observed, and Δ indicates that a slight stain was observed.

Fouling resistance:

A coated test specimen was bent along a half line and exposed outdoors (Kawasaki city) so that the upper portion had an angle of 30° from the horizontal plane, and the lower portion became vertical, and the coated surface faced outside. After 2 months of exposure, formation of the rain streak fouling was inspected. Symbol ○ indicates that no abnormality was observed, and Δ indicates that slight rain streak fouling was observed.

Weather resistance:

Gloss-maintaining ratio (%) at 60°, and −60° after subjecting to exposure for 6,000 hours by a Sunshine Weatherometer.

TABLE 10

| | Ex. 19 | Ex. 20 | Ex. 21 | Ex. 22 | Ex. 23 | Ex. 24 | Ex. 25 |
|---|---|---|---|---|---|---|---|
| Storage stability of the coating material | Good | Good | Good | Good | Good | Good | Good |
| Solvent resistance | Good | Good | Good | Good | Good | Good | Good |
| Acid resistance | ○ | ○ | ○ | ○ | ○ | ○ | ○ |
| Fouling resistance | ○ | ○ | ○ | ○ | ○ | ○ | ○ |
| Weather resistance | 98 | 97 | 99 | 95 | 98 | 99 | 98 |

TABLE 11

| | Ex. 26 | Ex. 27 | Ex. 28 | Ex. 29 | Ex. 30 |
|---|---|---|---|---|---|
| Storage stability of the coating material | Bad | Bad | Bad | Good | Bad |
| Solvent resistance | Good | Good | Good | Good | Good |
| Acid resistance | ○ | ○ | Δ | ○ | ○ |
| Fouling resistance | ○ | ○ | ○ | Δ | Δ |
| Weather resistance | 99 | 97 | 92 | 96 | 88 |

The fluorine-containing copolymer of the present invention gives a coating film excellent in chemical resistance, antifouling properties, weather resistance, etc., and presents excellent storage stability or efficiency for drying for e.g. a powder coating material. By using such a fluorine-containing copolymer and a polymer having hydrophilic groups in combination, it is possible to obtain a coating film excellent in rain streak fouling resistance.

What is claimed is:

1. A fluorine-containing copolymer comprising:
   (a) 35 to 65 mol % polymer units based on a fluoroolefin;
   (b) 5 to 45 mol % polymer units based on a cyclic aliphatic or heterocyclic monomer having, on its ring, an unsaturated group copolymerizable with the fluoroolefin, wherein said heterocyclic ring is selected from the group consisting of dihydrofuran, furan γ-pyran, pyrole and thiophene;
   (c) 1 to 30 mol % polymer units based on an ethylenically unsaturated compound having a curable moiety but having neither an ester bond nor an ether bond selected from the group consisting of allyl alcohol, 3-vinylcyclohexene oxide, 1,3-butadiene monoepoxide, 3-butenoic acid, 4-pentenoic acid, 3-hexenoic acid, 4-hexenoic acid, 5-hexenoic acid, 5-heptenoic acid, 6-heptenoic acid, 6-octenoic acid, 7-octenoic acid, 7-nonenoic acid, 8-nonenoic acid, 8-decenoic acid, 9-decenoic acid, 9-undecenoic acid, 10-undecenoic acid, 11-tridecenoic acid, 12-tridecenoic acid and a mixture thereof; and
   (d) 0 to 40 mol % polymer units based on at least one olefin selected from ethylene, propylene, and isobutylene, or polymer units based on a vinyl ether having an aliphatic ring, the amount of components (a), (b), (c) and (d) being based on the total amount of polymer units, wherein said copolymer has a number average molecular weight within a range of from 2,000 to 100,000 as calculated as polystyrene by gel permeation chromatograph, and which has rings based on said cyclic monomer, on the main chain of said copolymer.

2. The fluorine-containing copolymer according to claim 1, wherein the cyclic monomer is a norbornadiene or a norbornene.

3. A resin composition for coating, which comprises the fluorine-containing copolymer as defined in claim 1.

4. The resin composition for coating, which comprises the fluorine-containing copolymer as defined in claim 1 and a curing agent.

5. A resin composition for coating, which comprises the fluorine-containing copolymer as defined in claim 1, a curing agent and a polymer having hydrophilic groups.

6. The resin composition for coating according to claim 5, wherein the proportion of the curing agent is from 5 to 70 parts by weight, and the proportion of the polymer having hydrophilic groups is from 1 to 20 parts by weight, per 100 parts by weight of the fluorine-containing copolymer.

7. The resin composition for coating according to claim 5, wherein the number average molecular weight of the polymer having hydrophilic groups is from 500 to 5,000, as calculated as polystyrene by gel permeation chromatograph.

8. The resin composition for coating according to claim 7, wherein the polymer having hydrophilic groups is a partial hydrolyzate of polyvinyl acetate, a partial hydrolyzate of a copolymer of ethylene with vinyl acetate, or an acrylate or methacrylate polymer having an addition polymer of ethylene oxide on its side chain.

9. A resin composition for powder coating, which comprises the fluorine-containing copolymer as defined in claim 1.

10. A resin composition for powder coating, which comprises the fluorine-containing copolymer as defined in claim 1, and a curing agent.

11. A resin composition for powder coating, which comprises the fluorine-containing copolymer as defined in claim 1, a curing agent and a polymer having hydrophilic groups.

12. The resin composition for powder coating according to claim 11, wherein the number average molecular weight of the polymer having hydrophilic groups is from 500 to 5,000, as calculated as polystyrene by gel permeation chromatograph.

13. The resin composition for powder coating according to claim 11, wherein the polymer having hydrophilic groups is a hydrolyzate of polyvinyl acetate, a hydrolyzate of a copolymer of ethylene with vinyl acetate, or an acrylate or methacrylate copolymer having an addition polymer of ethylene oxide on its side chain.

14. The resin composition for powder coating according to claim 11, wherein the proportion of the curing agent is from 5 to 70 parts by weight, and the proportion of the polymer having hydrophilic groups is from 1 to 20 parts by weight, per 100 parts by weight of the fluorine-containing copolymer.

15. A resin composition for powder coating, which comprises particles having organic or inorganic particles having an average particle size of from 0.001 to 1 $\mu$m coated on the surface of particles comprising the fluorine-containing copolymer as defined in claim 1 and a curing agent and having an average particle size of from 5 to 50 $\mu$m.

16. A resin composition for powder coating, which comprises particles having organic or inorganic particles having an average particle size of from 0.001 to 1 $\mu$m coated on the surface of particles comprising the fluorine-containing copolymer as defined in claim 1, a curing agent and a polymer having hydrophilic groups and having an average particle size of from 5 to 50 $\mu$m.

* * * * *